No. 869,988.

PATENTED NOV. 5, 1907.

A. W. SMITH.
TYPE WRITING MACHINE.
APPLICATION FILED JAN. 12, 1906.

WITNESSES:

J. B. Reeves.

INVENTOR.

Arthur W. Smith
By Jacob Felbel

HIS ATTORNEY

No. 869,988.

PATENTED NOV. 5, 1907.

A. W. SMITH.
TYPE WRITING MACHINE.
APPLICATION FILED JAN. 12, 1906.

WITNESSES:

J. B. Reeves

M. W. Pool

INVENTOR.

Arthur W. Smith

By Jacob Felbel

HIS ATTORNEY

No. 869,988. PATENTED NOV. 5, 1907.
A. W. SMITH.
TYPE WRITING MACHINE.
APPLICATION FILED JAN. 12, 1906.

WITNESSES.

J. B. Reeves.
M. W. Pool

INVENTOR.

Arthur W. Smith

By Jacob Felbel

HIS ATTORNEY

UNITED STATES PATENT OFFICE.

ARTHUR W. SMITH, OF NEW YORK, N. Y., ASSIGNOR TO YOST WRITING MACHINE COMPANY, OF ILION, NEW YORK, A CORPORATION OF NEW YORK.

TYPE-WRITING MACHINE.

No. 869,988.      Specification of Letters Patent.      Patented Nov. 5, 1907.

Application filed January 12, 1906. Serial No. 295,801.

*To all whom it may concern:*

Be it known that I, ARTHUR W. SMITH, a citizen of the United States, and a resident of the borough of Manhattan, city of New York, in the county of New York and State of New York, have invented certain new and useful Improvements in Type-Writing Machines, of which the following is a specification.

My invention relates more particularly to tabulating devices for typewriting machines. Such machines, whether of the class in which the paper support is movable or of the class in which the paper is stationary and the printing mechanism is movable. relatively thereto, have heretofore been provided with means for releasing the movable member from its step-by-step feeding mechanism in order to permit a free run of said movable member until arrested by one of a number of stops which define columnar positions or fields along the line of print.

My present invention has for an object to provide columnating mechanism which may be set so that when the movable member is released from its feeding devices it will be arrested by the engagement of the selected column stop with the coöperating stop member, skipping all the column stops which may be intermediate the selected column stop and the coöperating stop member.

Another object is to combine such columnating mechanism with a denominational stop mechanism so as to arrest the run of the movable member at any one of a plurality of adjacent letter space positions in a selected columnar field.

Another object is to provide improved means for regulating the speed of the carriage after it has been released from its feed devices.

Another object is to provide an improved construction of column stop.

Other objects will subsequently appear.

To the above ends my invention consists in the features of construction, combinations of devices and arrangements of parts hereinafter fully described and particularly pointed out in the claims.

The invention will be explained in connection with the accompanying drawings, wherein.

In various views parts are omitted and broken away for the sake of clearness.

I have shown my invention as applied to a front-strike typewriting machine of the character shown in my application No. 260,441 filed May 15th, 1905, but it is to be understood that it may be adapted to other forms of writing machines.

Figure 1:
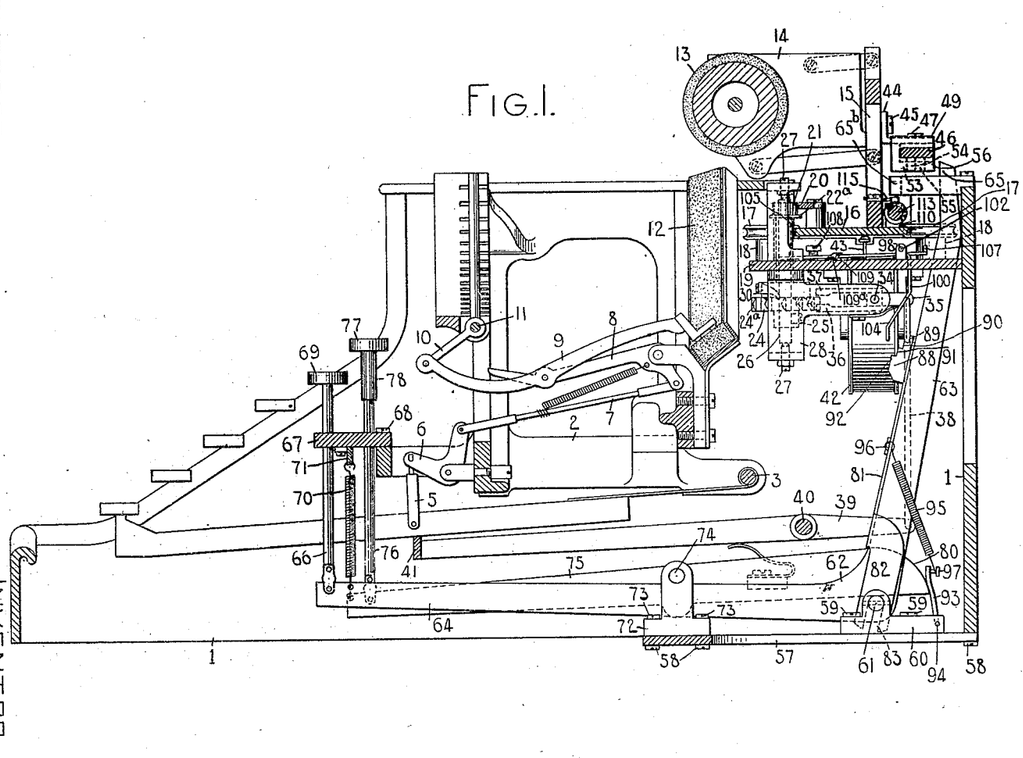
Figure 1 is a longitudinal, vertical, sectional view of so much of a typewriting machine as is necessary to illustrate my invention.
Figures 7, 8, 9, 10:
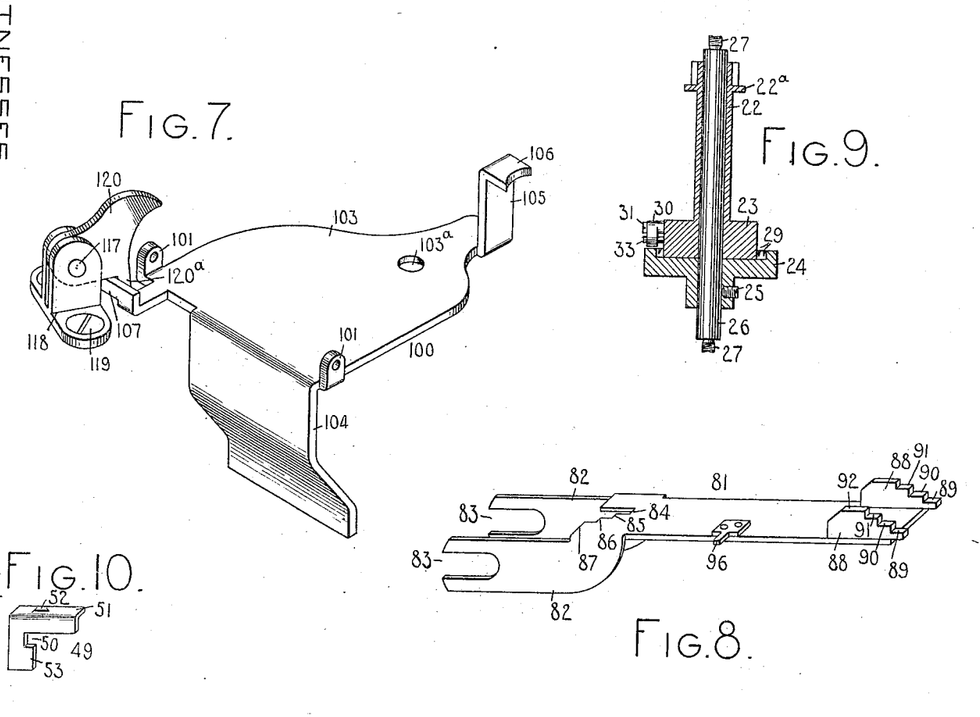
Fig. 7 is an enlarged perspective view of a part hereinafter termed the carriage releasing member or release plate and of one of the parts of the means for regulating the speed of the carriage when released.
Fig. 8 is an enlarged perspective view of one of the parts of the column selecting mechanism hereinafter termed the column selecting member or slide.
Fig. 9 is an enlarged detail vertical sectional view of part of the carriage feeding mechanism, the section being taken on the line x—x of Fig. 6.
Fig. 10 is an enlarged perspective view of one of the column stops.

In the drawings the main frame 1 of the machine has mounted in it an auxiliary frame 2 in which is pivoted at 3 a key lever 4, said key lever being one of a series of key levers each of which is connected by a link 5, bell crank 6, link 7 and driver 8 with a type bar 9 (Fig. 1). The type bars 9 are arranged in a segment of a circle and each is connected with a guide link 10 pivoted at 11 in the auxiliary frame 2. The types with which one end of each type bar is provided rest normally against a segmental inking pad 12. The type bars are adapted to coöperate with the front face of a cylindrical platen 13 mounted in a platen frame 14, said platen frame in turn being mounted in a carriage truck 15, the base 16 whereof coöperates with rollers 17 mounted on standards 18 which are secured to a shelf-like part 19 fixed to the main frame. A feed rack 20 is mounted on the base 16 of the carriage truck and meshes with a feed pinion 21 which, as best seen in Fig. 9, is at the upper end of a vertical sleeve 22, the latter having an enlarged base portion 23, which is normally seated in a depression in an escapement wheel 24 having radial teeth 24ª. The escapement wheel is fixedly secured by a set screw 25 to an upright shaft 26 which passes through the bore of the sleeve 22. The ends of the shaft 26 are pivoted on adjustable pivot screws 27 which are threaded into the upper and lower ends of a bracket 28 (Figs. 1, 3 and 6), said bracket being secured by screws 28ª to the shelf 19. The upper face of the escapement wheel 24 is provided with notches 29 with which a pawl 30 pivoted at 31 to the base 23 of the sleeve 22 normally coöperates, said pawl being pressed towards the escapement wheel by a spring 32 and being limited in its downward movement around its pivot 31 by a stop 33. The pawl 30 normally engages one of the notches 29 so that the sleeve 22 and pinion 21 are permitted to turn only when the escapement wheel 24 is permitted to turn during the movement of the carriage in the direction of its feed, but said sleeve is adapted to be raised or moved longitudinally in a manner presently to be described so as to disengage the pawl from the notches or teeth 29 of the escapement wheel and to permit the pinion 21 to turn freely under the influence of the carriage propelling means. When the carriage, comprising platen frame 14 and carriage truck 15, is moved from left to right across the machine the pawl 30 rides freely over the upper face of the escapement wheel 24 passing in and out of the notches 29. Pivoted at 34 to the bracket 28 is a dog rocker 35 (Fig. 1) upon which are mounted escapement dogs 36 and 37, said dogs being adapted to coöperate with the teeth 24ᵃ on escapement wheel 24. The dog rocker 35 is connected by a link 38 with a universal bar frame 39 pivoted at 40 in the main frame of the machine and carrying a universal bar 41 which extends from side to side of the machine beneath the series of key levers 4 and is adapted to be actuated by any one of said key levers when the latter is adequately depressed to operate the associate type bar. When the universal bar is thus actuated it acts upon the dog rocker 35 through the link 38, causing the dogs 36 and 37 to coöperate with the escapement wheel to permit one tooth 24ᵃ to escape, thereby permitting the carriage to be drawn a letter space distance in printing direction under the influence of a carriage spring drum 42 with which said carriage is connected by a cord or band 43 (Fig. 1). The devices hereinbefore described form the subject-matter of the application heretofore referred to and to other applications hereafter to be filed by me and it is not therefore deemed necessary to describe such devices herein at greater length.

Figures 5, 6:
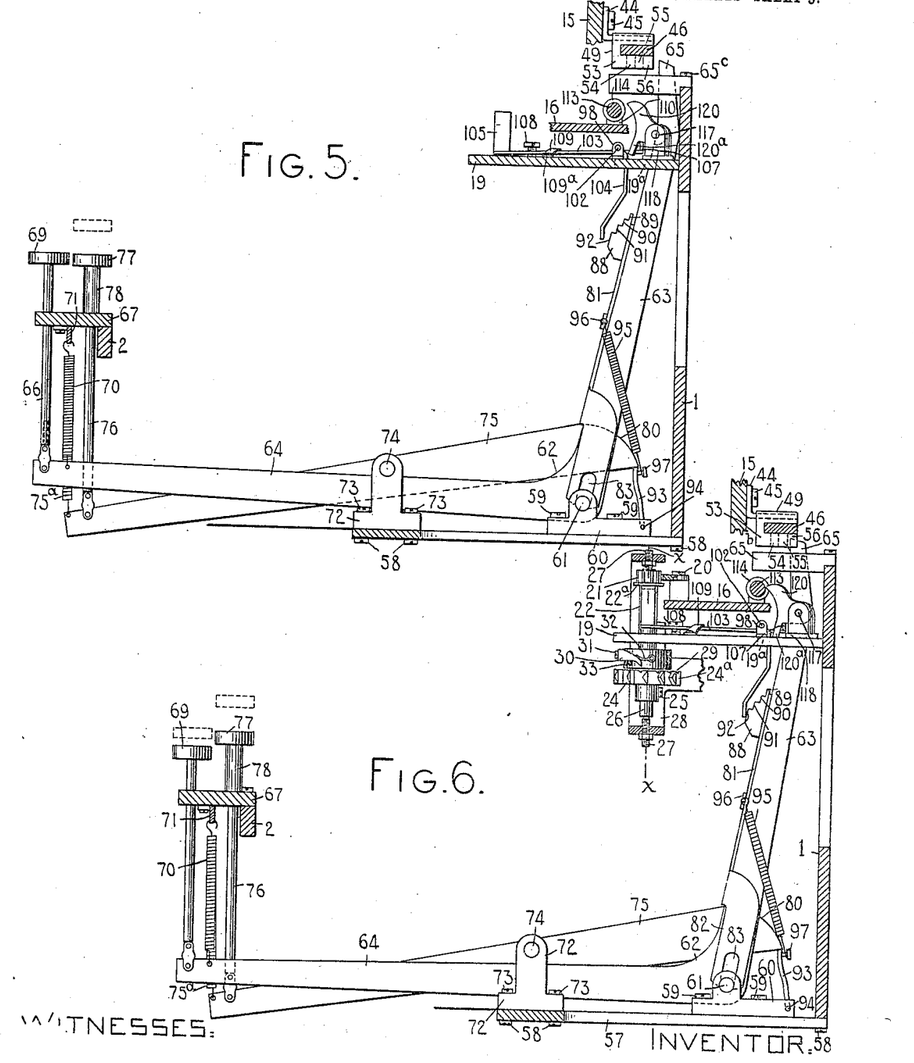
Fig. 5 is a side view of parts of the tabulating mechanism as they appear when the column selecting mechanism is set for a particular column and when the denominational stop mechanism is in normal position.
Fig. 6 is a side view of parts of the tabulating mechanism as they appear when the column selecting mechanism is set for a particular column and when the denominational stop mechanism is in operative position.

Right-angled brackets 44 are secured to the rear of the carriage truck 15, one at or near each end of said truck, by screws 45, and a column stop bar 46 extends longitudinally of the carriage truck and is secured to the brackets 44 by screws 47. The bar 46 is provided at its upper and lower faces with notches 48 a letter space distance apart, thereby forming series of oppositely disposed teeth which are adapted to receive between them one or more column stops 49. Each column stop is preferably formed of a flat metal plate which, as best appears in Fig. 10, is cut-away to form a notch 50 which fits over or embraces the toothed or rack bar 46. The upper part of the metal plate of which the stop 49 is formed is bent over at right-angles to the body portion, forming a ledge or lip 51, the surface of which preferably is stamped or otherwise provided with a numeral or other indicating mark 52. The portion of each stop below the notch 50 serves as a contact surface which coöperates with the denomination stops, presently to be described, to arrest the carriage when released from the escapement mechanism. The stop illustrated in Fig. 10 is marked with the indicating numeral "1" and is designed to define, with the coöperating stops described later, the first columnar field. The contact surface of this stop is designated by the reference numeral 53 and is quite short, extending beneath the rack bar 46 a comparatively limited distance toward the rear of the machine. The next column stop to the right of the column stop marked "1" is marked "2" and is provided with a contact surface 54, which, as indicated in Fig. 1, extends further towards the rear of the machine than does the "1" stop. Four column stops are shown in the drawings, the third stop stamped with the numeral "3" being provided with a contact surface 55 extending rearwardly beyond the contact surface 54 and the fourth stop stamped "4" being provided with a contact surface 56 extending rearwardly beyond the contact surface 55 of the "3" stop. The contact surfaces of the set of column stops, as will be observed in Figs. 5 and 6, are out of transverse alinement with each other or lie in different transverse planes and extend or are stepped progressively from the front towards the rear of the machine. The number of column stops employed will depend, of course, upon the character of work in hand and may be greater or less than the number shown in the drawings. Whatever the number of such stops employed, however, care must be taken that they are arranged in proper order upon the column stop rack bar so that their contact faces increase progressively from front to rear. The numerals or other indicating marks with which I prefer to provide the stops afford a convenient and certain method of identifying them without comparing them with the other column stops, so that all that are to be employed may be readily arranged in order along the rack bar.

The denomination stops which coöperate with the column stops will now be described. A T-shaped base plate 57 is secured to the under side of the main frame at the rear by screws 58, and fixed to the rear arm of this plate by screws 59 are brackets 60. There are two of these brackets suitably spaced apart and serving to support a rod 61 upon which is fulcrumed a set of denomination stop members. As herein shown these stop members are in the form of bell crank levers 62 having arms 63 extending upwardly through an opening 19ᵃ in the plate 19 and horizontally-disposed arms 64 extending forwardly under the key levers 4. The upper portion 65 of each arm 63 serves as a denomination stop which is adapted to be swung forward varying distances transversely of the path of the column stops 49 in a manner presently to be described in order to coöperate with the contact surface of one or another of said column stops. The stop portions 65 of the lever arms 63 are guided in slots 65ᵃ (Fig. 3) formed in a horizontally disposed guide plate 65ᵇ which is secured to the rear of the main frame 1 by screws 65ᶜ. The forward end of each of the arms 64 of the denomination stop members has suitably secured to it a key stem 66 which extends upwardly and bears in a guide or bearing plate 67 secured by screws 68 to the auxiliary frame 2. Each key stem is provided with a key cap 69 and each arm 64 has connected to it a restoring spring 70 which is vertically disposed and has its upper end hooked in a bracket 71 suitably secured to the under side of the bearing plate 67. The number of denomination stops may be varied, of course, but I prefer to employ eight of such stops, the keys whereof, reading from right to left are marked in order—"M", "HT", "10T", "T", "H", "T", "I", ".". As appears from the drawings, I prefer to leave a letter space between the "millions" stop 65 and the "hundred thousands" stop 65 and another letter space between the "thousands" stop 65 and the "hundreds" stop 65 in order that the numbers when written may be properly pointed off or punctuated, although, of course, this arrangement is not essential.

Figure 4:
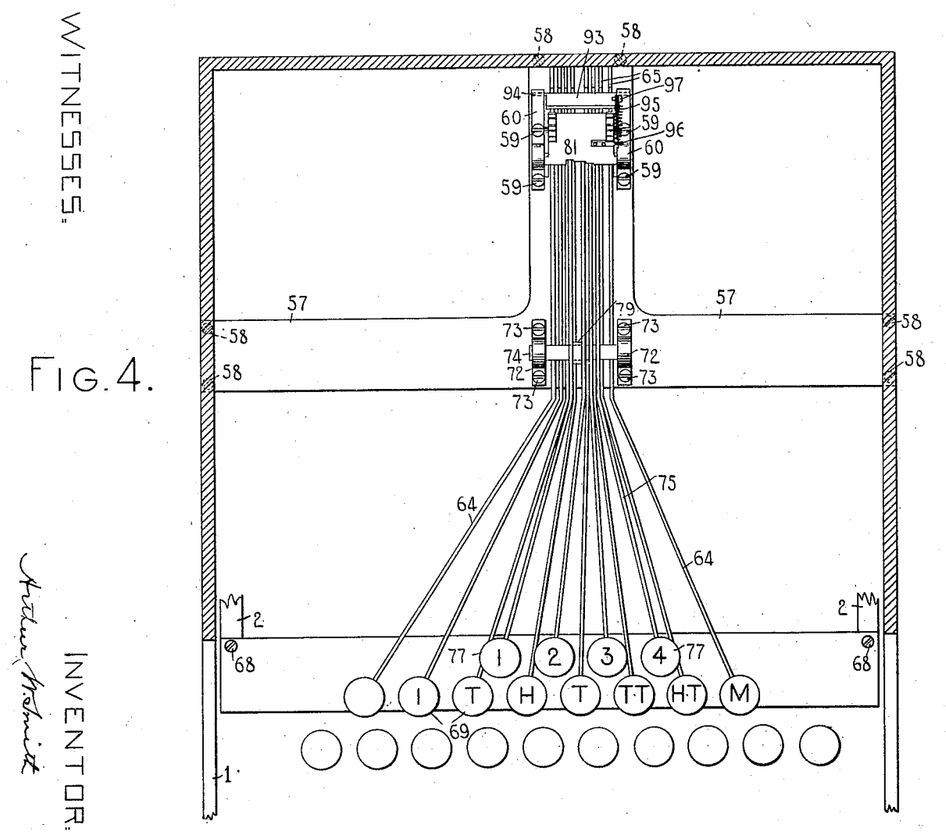
Fig. 4 is a horizontal sectional view taken below the top plate of the machine.

Referring now to the column selecting mechanism which I prefer to employ in coöperation with the above described denomination stop mechanism, two brackets 72 are secured by screws 73 to the plate 57 forward of the bracket 60, said brackets 72 supporting a rod 74 which serves as a fulcrum for a set of column selecting levers 75 which are horizontally disposed. The forward arms of the levers 75 have key stems 76 suitably secured to them, said key stems extending upwardly and bearing in the plate 67. The key stems 76 are provided with key caps 77 which are preferably provided with shanks 78, the latter being bored out and fitted over the tops of the key stems 76 to which they are secured. The ends of the shanks 78 constitute stops that are adapted to contact with the top of the plate 67, when the keys 77 are operated, to limit the depression of said keys. The number of column selecting levers may vary according to the number of column stops 49 intended to be employed, four of such levers being shown in the drawings for use in connection with the four column stops shown. The keys 77 for the levers 75 are marked respectively, reading from left to right, "1", "2", "3" and "4". As will be understood from an inspection of Figs. 1 and 4 the denomination keys 69 and the column selecting keys 77 are to the rear of and above the regular keyboard of the machine, the key stems 66 and 76 being disposed between the character key levers 4. The rear portions of the lever arms 64 are arranged rather close together where the levers 75 are received between them and where they pass beneath the rod 74; but forward of the brackets 72 said lever arms 64 are fanned or bent laterally towards the sides of the machine, so that the keys at their forward ends are properly spaced apart as best appears in Fig. 4. The column selecting levers 75 are each preferably arranged between two of the lever arms 64 as pointed out above and are fanned outwardly forward of their fulcrum 74, so that the keys at their forward ends are staggered in respect of the denomination keys which are just in front of and below them. A collar 79 (Fig. 4) is secured to the rod 74 just to the left of the second column selecting lever 75, said collar serving to prevent lateral displacement of said lever, there being no denomination stop lever arm contiguous to said second column selecting lever because of the space allowed for punctuation between the denomination stop lever arms. The rear ends of the levers 75 are rounded to provide cam edges 80. The top edges of the levers 75 are adapted to coöperate with a column selecting member or slide 81 (best shown in Fig. 8), which is preferably made of sheet metal and is bent to provide ears 82 which latter are formed with slots 83 at their lower ends. The slots 83 fit down over or straddle the fulcrum rod 61 outside the denomination stop members 62, so that all of the denomination stop members and the column selecting levers are embraced between the ears 82. The lower edge of the body portion of the element or slide 81 is cut away between the ears 82 to provide contact edges 84, 85, 86 and 87 which are adapted to coöperate respectively with the upper edges of the first, second, third and fourth column selecting levers (counting from left to right), in such wise that each of said levers moves said slide a different extent from the other levers. The upper end of the body portion of the slide is provided with contact portions 88 each of which is formed with a series of steps or contact faces 89, 90, 91 and 92. A locking plate 93 is disposed between the rear ends of the brackets 60 and is pivoted to them at 94. A coiled spring 95 has one end secured to a lug 96 on the slide 81 and the other end secured to a headed pin or lug 97 fixed to the locking plate 93. Said spring serves normally to maintain the body portion of the slide 81 in contact with the front edges of the lever arms 63 and to maintain the locking plate 93 in contact with the cam edges 80 of the levers 75 and also to pull downward on the slide 81. The normal position of the parts is best shown in Fig. 1.

Upwardly extending brackets 98 are secured to the shelf 19 by screws 99 (Figs. 1 and 3) and said brackets serve to pivotally support a releasing member 100 which is adapted to be actuated by the contact portions 88 of the slide 81 to release the carriage from its step-by-step feeding mechanism. As best appears in Fig. 7 the carriage releasing member is herein shown in the form of an angled plate or elbow lever 100 which is provided with perforated ears 101 which receive pivots 102 extending from the brackets 98. The angled release plate 100 comprises a horizontally disposed portion 103 which normally rests at its forward end against the shelf 19, as indicated in Figs. 1 and 5, and a downwardly and forwardly extending portion 104 which extends through the opening 19ᵃ and the lower edge of which is adapted to coöperate with the steps of the contact portions 88 of the column selecting slide. An arm 105 extends upwardly from the forward end of the portion 103 of the release member or plate, said arm being provided with a lip or ledge 106 which lies normally beneath and just out of contact with a flange 22ᵃ on the sleeve 22 (Fig. 3), so that when the release plate is sufficiently tilted on its pivots 102 by the slide 81, the forward end of the plate is elevated and the lip 106 moves the sleeve 22 upwardly and longitudinally of the shaft 26, thereby disconnecting the pawl 23 from engagement with the teeth 29 of the escapement wheel, thus disconnecting the carriage feed pinion 21 from operative connection with the escapement wheel 24. Extending rearwardly and laterally from one side of the rear edge of the portion 103 of the release plate is an arm 107 which serves to automatically render operative or inoperative the means for regulating the speed of the carriage in a manner presently to be described. A limiting screw 108 (Figs. 1, 5 and 6) is threaded into the top of the shelf 19, said screw passing loosely through an opening 103ᵃ in the release plate and the head of said screw being in a position to engage the top face of the release plate when the latter is swung upwards and thereby serving as a stop to limit the movement of said plate. The release plate is provided with a restoring spring 109 secured by a screw 109ᵃ to the shelf 19.

Figure 2:
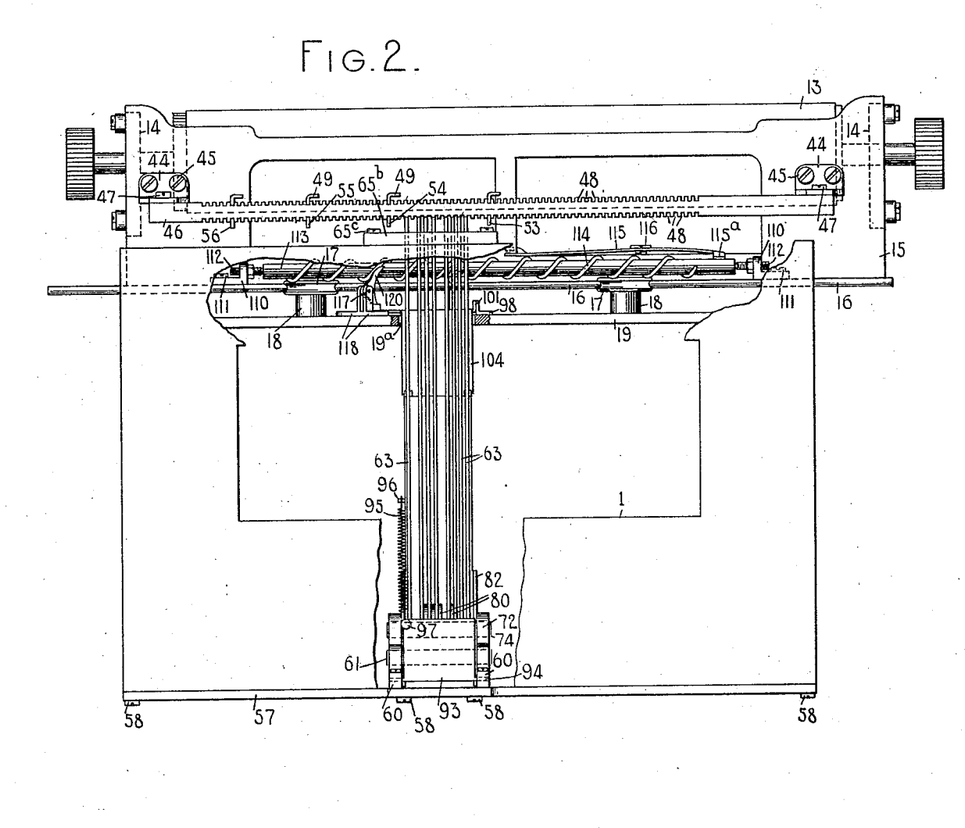
Fig. 2 is a rear elevation of the machine with parts broken away.
Figure 3:
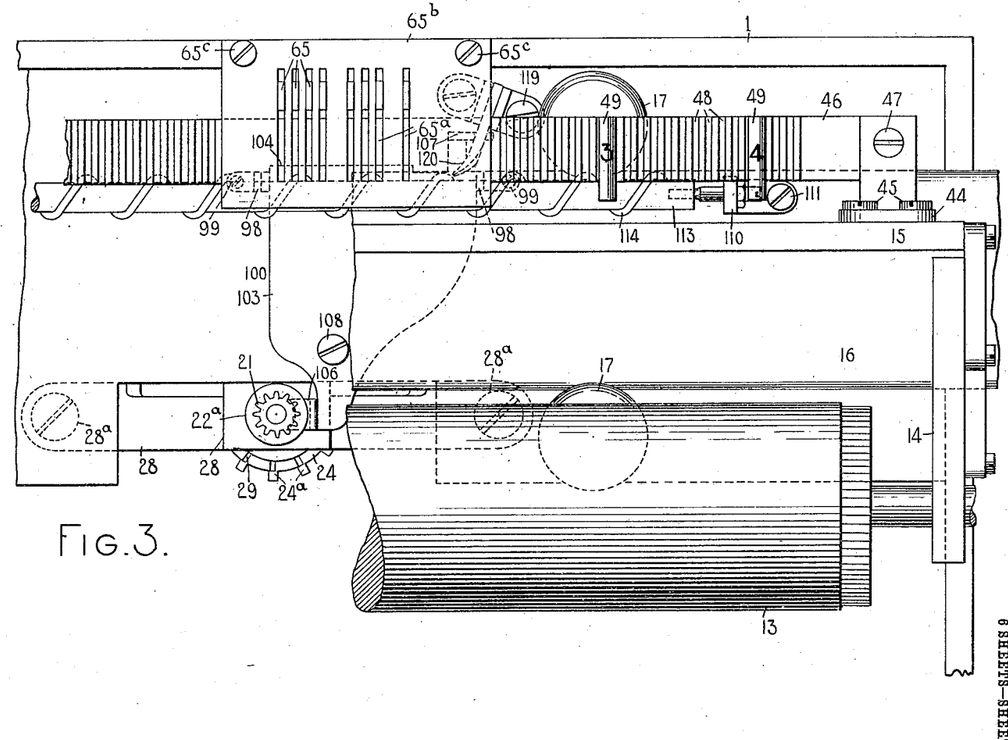
Fig. 3 is an enlarged fragmentary top plan view of the machine.

In order to retard the carriage somewhat when it has been freed from its step-by-step feeding mechanism, for the purpose of preventing a too violent engagement between the coöperating stops of the tabulating devices, I provide means for regulating the speed of the carriage, which means will now be described, it being understood, of course, that while the use of such speed regulating devices in combination with the tabulating mechanism is preferred they are not absolutely essential. As best shown in Figs. 2 and 3, brackets 110 are secured to the base of the carriage truck by screws 111 and mounted in said brackets are screw pivots 112, the inner ends of which engage with depressions in the ends of a screw rod 113 which extends longitudinally of the carriage truck and is adapted to rotate on the pivots 112. Said rod is provided with a raised spiral thread 114. A flat spring 115 is secured to the carriage by a screw 116 and has an angular end 115$^a$ extending rearwardly and contacting with the screw rod 113 near one of the unthreaded ends of the latter. The inner end of the spring 115 is bifurcated to embrace the central web of the carriage truck 15 (Fig. 2). By means of the screw 116 the friction of the spring 115 on the screw rod 113 may be increased or decreased in order to permit the screw rod to rotate more or less freely. Pivoted at 117 (Figs. 2, 6 and 7) in a bracket 118, which is secured by screws 119 to the shelf 19, is a finger-like member 120 which is adapted to drop by gravity into position to coöperate with the raised thread 114, but which is normally maintained out of engagement with said thread by the arm 107 of the release plate, so that during the ordinary letter spacing operations the carriage is permitted to move step-by-step without being retarded by the speed regulating devices. When said carriage is freed by the operation of the release plate 100, the arm 107 moves downwardly and permits the finger 120 to engage with the raised thread 114 so that as the carriage is drawn leftward by the spring drum the finger 120, being in engagement with the raised thread 114, will cause the rod 113 to rotate on its longitudinal axis and thereby prevent a too rapid movement of the carriage.

The operation of the devices hereinbefore described may be briefly explained. Carriage stops 49, to the number requisite for the work in hand, are adjusted upon the stop bar 46 in position to coöperate with the denomination stops to define the columnar fields in the desired places widthwise of the work sheet or paper. Preferably the rack bar 46 is provided with a scale corresponding with the usual carriage scale in order to facilitate the proper placing of the column stops. The stops are arranged with the column stop stamped or numered "1" at the left, the next stop to the right being the stop numbered "2", which in turn is followed by the one numbered "3", and so on. For the purpose of illustration it will be assumed that four column stops are employed. Suppose that with the carriage situated so that the "1" column stop is to the right of the entire set of denomination stops 65, it be desired to write in the fourth column, that is, in the field of the column stop numbered "4". The fourth column selecting key 77 (which in the drawings is marked "4") is first depressed, thereby swinging the forward arm of the associate lever 75 downward about the pivot 74 and the rear arm of said lever upward about said pivot. As the rear arm of the lever moves upward its upper edge engages with the contact edge 87 of the slide 81 and raises said slide upward against the pull of the spring 95, the edges of the slots 83 sliding over the rod 61. The upward movement of the slide continues until the shank 78 of the fourth column key contacts with the plate 67. When this occurs the bottom edge of the rear end of the lever 75 will have been swung up above the top edge of the locking plate 93, which meantime has been cammed backward by the cam edge 80 of the fourth lever 78. As soon as said lever clears the top of the locking plate 93 the spring 95 pulls said plate forward about its pivots 94 until said locking plate lies under the actuated lever 75, thereby locking said lever in raised position. The parts are so proportioned and adjusted that the upward movement of the slide 81, under the influence of the fourth column selecting lever, brings the foremost contact faces 92 of the portions 88 opposite the lower part of the downwardly extending arm 104 of the release plate 100. The operator now releases the fourth column key but the parts are maintained in the operative position, indicated in Fig. 5, by the locking plate 93. Assuming that the number to be written in the fourth columnar field is 125,000, for example, the next step is to depress the "hundred thousands" denomination key 69 (marked "HT" in the drawings). As the selected denomination key is depressed, the arm 64 of the associate bell crank lever 62 is swung downwardly about the fulcrum 61 and the upstanding arm 63 of said lever is swung forwardly about said fulcrum. As the arm 63 is swung forward the stop 65 at the upper end thereof is moved transversely of the stop bar 46, passing beneath said bar. As the lever arm 63 moves forwardly it carries with it the slide 81, swinging the latter about the rod 61 as a fulcrum and causing the contact faces 92 on said slide to engage the lower end of the release plate 100, so that as the swinging movement of the slide continues the horizontally disposed arm 103 of the release plate will be swung upwardly about the pivots 102, causing the ledge 106 to engage the flange 22$^a$ of the sleeve 22 and move the latter upwards to disengage the pawl 30 from the notch 29 in the escapement wheel 24. The teeth of the feed pinion 21 are of such length that during this upward movement the said pinion will remain in mesh with the carriage feed rack 20, but as soon as the pawl 30 disengages from the escapement wheel 24 the feed pinion is disconnected from the escapement devices, and the carriage thus released from its letter space feeding mechanism is drawn leftward under the influence of the spring drum 42. The longitudinal movement of the sleeve 22 and the upward movement of the pinion 21 continue until the release plate arm 103 contacts with the limiting screw or stop 108, thereby preventing further movement of the release plate. The parts are so adjusted that when the release of the carriage occurs, the actuated denomination stop 65 has been projected forward until it lies in the path of the contact surface 56 of the fourth column stop, and said denomination stop is prevented from being projected further forward, and into the path of the contact surface 55 of the third column stop, by the contacting of the face 92 with the lower end of the arm 104 of the release plate 100, which plate, it will be recalled, is now in engagement with its limiting stop 108 (Fig. 6). The result is that the carriage will be drawn freely leftward by its propelling means and the first, second and third column stops will pass the projected denomination stop, since the latter has not been projected far enough forward to enter the paths of their contact surfaces; but the contact surface 56 of the fourth column stop will contact with the projected denomination stop 65 and will arrest the carriage. As the release plate moves to effect the release of the carriage, the arm 107 of said release plate moves downward and permits the finger 120 to engage with the raised thread 114 on the screw-rod or screw 113. The finger 120 is provided with a tail 120ᵃ which contacts with the shelf 19 to limit the movement of the finger and prevent its being jammed against the rod 113, as best appears in Fig. 6. The engagement of the finger with the screw rod causes the latter to rotate and the resistance due to the action of the engaging parts slightly retards the speed of the carriage during its movement or "jump" preventing a violent impact of the fourth column stop against the projected denomination stop.

The operator now releases the "HT" denomination key and under the influence of the associate restoring spring 70, the restoring spring 109, and of gravity the actuated denomination lever 62, the release plate 100 and the finger 120 will be restored to normal position, as indicated in Fig. 5. The restoration of the release plate to normal position permits the sleeve 22 to move downward longitudinally of the shaft 26 until the pawl 30 engages with the escapement wheel 24, thereby reconnecting the latter with the feed pinion 21. The fourth column selecting lever 75, however, will be still maintained in raised position by the locking plate 93 and will hold the slide 81 raised, although the latter will be drawn back along with the upstanding arms 63 of the lever 62 by the pull of the draw spring 95 until said slide is in the position indicated in Fig. 5. The desired number, viz., 125,000 may now be written by properly operating the appropriate number keys in the regular keyboard and said number will, as will be readily understood, be properly positioned in the fourth column on the work sheet or paper.

If when next it is desired to employ the tabulating device, the number to be written lies in the fourth column, it will only be necessary to actuate the proper denomination key 69, for, as will be recalled, the column selecting mechanism is still set so that when any denomination stop is projected it will be arrested in position to coöperate with the fourth column stop. This is an especially valuable feature of my invention, for in tabulating work it frequently occurs that a plurality of successive numbers are to be written in the same column and when this is the case it is only necessary to actuate the proper column selecting key 77 for the first one of such successive numbers, the associate column selecting mechanism remaining set or locked in operative position not only for the first but for all the succeeding numbers in the same column. When, however, it is desired to write in any other column it is only necessary to depress the proper column key 77, the result being that the column selecting device associated with said depressed column key will be moved to operative position while at the same time the hitherto operative column selecting device will be unlocked and permitted to return to normal position. For example, suppose instead of writing a number in the fourth column (for doing which the column selecting devices are positioned and locked as indicated in Fig. 5) it be desired to write in some other column, as the second. The operator first depresses the "2" column key, thereby swinging the forward arm of the associate lever 75 downward about the fulcrum 74 and the rear arm of said lever upward about said fulcrum. As the rear arm of said lever moves upward the lower end of the cam 80 will push against the locking plate 93 and will swing the latter rearwardly on its pivots against the pressure of the draw spring 95. As will be noted in Fig. 5 there is a slight curve or forward bulge near the top of the locking plate 93 and as the point of the cam 80 rides or slides over this the locking plate will be swung rearwardly far enough to clear the bottom edge of the fourth column selecting lever, permitting the latter to be restored to normal position under the influence of a restoring spring 75ᵃ (Figs. 5 and 6), one end of which is connected to the lever and the other end to the bracket 71. It will be understood that each lever 75 is provided with a similar restoring spring. As the fourth column selecting lever 75 starts to return to normal position the slide 81 will be drawn downward under the influence of the draw spring 95 until said slide engages with the upwardly moving second column selecting lever. The contact edge 85 with which the second column selecting lever coöperates is cut higher in the slide 81 than is the edge 87 which coöperates with the fourth column selecting lever, as clearly appears from an inspection of Fig. 8. Consequently the upper edge of the second column selecting lever which will now be free to act on the contact edge 85, will not move said slide 81 as far upward as did the fourth column selecting lever. The parts are so proportioned and adjusted that when the second column selecting lever reaches the limit of movement and is locked by the plate 93, the slide 81 will have been moved upward into a position where the contact faces or steps 90 are in position to coöperate with the lower end of the arm 104 of the release plate 100. It will be seen from an inspection of Figs. 1, 5 and 6 that the steps 90 are further to the rear of the lower end of the depending arm 104 of the elbow lever or release plate 100. Consequently, if now the desired denomination key 69 be operated, the associate denomination stop 65 and the slide 81 will be swung forward a greater distance before the contact faces 90 engage the arm 104 of the release plate and coöperate therewith to release the carriage. The parts are so proportioned that when this release occurs the operated denomination stop will have been projected forward into the path of the contact face 54 of the "2" column stop. In other words, the effective movement of the denomination stop will have been such that the first column stop will pass the projected denomination stop, but the second or "2" column stop will contact therewith and arrest the carriage. Subsequent operations may be proceeded with in the manner outlined above.

The contact surfaces of the column stops are of sufficient width to afford a considerable margin of safety within which the effective movements of the denomination stops may vary and so that the adjustments of the various parts are not so nice as to preclude satisfactory and practicable results. When the release plate 100 engages with its limiting screw stop 108 the lower end of the depending arm 104 of said release plate becomes practically a fixed abutment with which the contact members 88 engage to hold the projected denomination stop from further forward movement and retain it with certainty in the path of the particular column stop, with which it is to coöperate. It will furthermore be noted that I provide a column selecting element or member 81 which is movable in one direction by the column selecting levers and is movable in another direction crosswise of the first direction by the denomination stop members, so that the stepped contact portions of the element or slide 81 may co-act with the relatively fixed abutment 104 to bring the actuated denomination stop into position to coöperate with a predetermined column stop.

While I have shown and described a preferred construction of denomination stop members each comprising a stopping part 65 and an actuating arm 63 therefor, it is to be understood that equivalent constructions are embraced within the scope of my claims, and that instead of being formed of a single piece as shown, each denomination stop member may, if desired, have such a construction, for example, as that usually found in the Gorin tabulator wherein a sliding denomination stop is connected by a pin and slot connection with the actuating arm of a lever of the first class, the other arm whereof is connected with a push rod. It is furthermore to be understood that what has been said in connection with the denomination stop members concerning equivalent constructions applies also to the other parts, features and combinations and arrangements of my invention, and that not only may various changes be made in these respects without departing from the scope of the invention, but that various parts of it may be used without other parts.

What I claim as new and desire to secure by Letters Patent is:—

1. In a typewriting machine and in a tabulating mechanism, the combination of a releasable carriage; carriage feeding mechanism; a plurality of column stops; a coöperating stop member; and a column selecting member operative by said stop member to effect the release of the carriage and to cause said stop member to coöperate with a predetermined column stop to arrest the carriage.

2. In a typewriting machine and in a tabulating mechanism, the combination of a releasable carriage; carriage feeding mechanism; a plurality of column stops; a column selecting member; hand operated mechanism for variably setting said column selecting member to enable it to select predetermined columns; and a movable stop member for coöperating with said column stops, said column selecting member being adapted, after it has been set, to be actuated by said stop member to cause the release of the carriage and said stop member being adapted to coöperate with the particular column stop predetermined by the column selecting member.

3. In a typewriting machine and in a tabulating mechanism, the combination of a releasable carriage; carriage feeding mechanism; a plurality of column stops; a column selecting member; key-controlled column selecting devices adapted to set said column selecting member for different columns; and a movable stop member operative to actuate said column selecting member to cause the release of the carriage and the coöperation thereafter of said stop member with a predetermined column stop to arrest the carriage.

4. In a typewriting machine and in a tabulating mechanism, the combination of a releasable carriage; carriage feeding mechanism; a plurality of column stops; a column selecting member; key-controlled column selecting devices adapted to move said column selecting member different extents; means for maintaining said member in the positions to which it is moved by said column selecting devices; and a movable stop member operative to actuate said column selecting member after it has been set, in order to cause the release of the carriage and the coöperation thereafter of said stop member with a predetermined column stop.

5. In a typewriting machine and in a tabulating mechanism, the combination of a releasable carriage; carriage feeding mechanism; a plurality of column stops; a column selecting member; key-controlled column selecting devices adapted to move said column selecting member different extents; means for maintaining said member in the positions to which it is moved by said column selecting devices; a movable stop member operative to actuate said column selecting member after it has been so set, in order to cause the release of the carriage and the coöperation thereafter of said stop member with a predetermined column stop; and means for causing the arrest of said stop member after it has been moved to position to coöperate with said predetermined column stop.

6. In a typewriting machine and in a tabulating mechanism, the combination of a releasable carriage; carriage feeding mechanism; a plurality of column stops; a column selecting member; key-controlled column selecting devices adapted to move said column selecting member different extents; means for maintaining said member in the positions to which it is moved by said column selecting devices; a movable stop member operative to actuate said column selecting member after it has been so set, in order to cause the release of the carriage and the coöperation thereafter of said stop member with a predetermined column stop; and means for limiting the movement of said column selecting member when actuated by said stop member, said means thereby serving to arrest said stop member when it has reached a position to coöperate with a predetermined column stop.

7. In a typewriting machine and in a tabulating mechanism, the combination of a carriage; carriage feeding mechanism; a plurality of column stops; a column selecting member; key controlled column selecting devices adapted to move said column selecting member different extents; means for maintaining said member in the positions to which it is moved by said column selecting devices; a movable stop member operative to actuate said column selecting member after it has been so set; and a carriage releasing member adapted to be actuated by said column selecting member to release the carriage so as to cause the coöperation of said stop member with a predetermined column stop.

8. In a typewriting machine and in a tabulating mechanism, the combination of a carriage; carriage feeding mechanism; a plurality of column stops; a column selecting member; key controlled column selecting devices adapted to move said column selecting member different extents; means for maintaining said member in the positions to which it is moved by said column selecting devices; a movable stop member operative to actuate said column selecting member after it has been so set; and a carriage releasing member adapted to be actuated by said column selecting member to release the carriage so as to cause the coöperation of said stop member with a predetermined column stop, said carriage releasing member serving as a stop to arrest said stop member after it has been moved to position to coöperate with said predetermined column stop.

9. In a typewriting machine and in a tabulating mechanism, the combination of a carriage; carriage feeding mechanism; a plurality of column stops; a coöperating movable stop member comprising a stop part and an actuating arm; and means including a column selecting member operative by the actuating arm of said stop member to effect the release of the carriage and to cause the stop part of said stop member to coöperate with a predetermined column stop to arrest the carriage.

10. In a typewriting machine and in a tabulating mechanism, the combination of a carriage; carriage feeding mechanism; a plurality of column stops; a column selecting member; hand operated mechanism for variably setting said column selecting member; and a movable stop member comprising a stop part and an actuating arm, said column selecting member, after it has been set, being operative by the actuating arm of said stop member to cause the release of the carriage and the coöperation thereafter of the stop part of said stop member with a predetermined column stop in order to arrest the carriage.

11. In a typewriting machine and in a tabulating mechanism, the combination of a carriage; carriage feeding mechanism; a plurality of column stops; a column selecting member; key controlled column selecting devices adapted to move said column selecting member different extents; means for maintaining said member in the positions to which it is moved by said column selecting devices; and a movable stop member comprising a stop part and an actuating arm, the arm of said stop member being adapted to operate said column selecting member after it has been set and thereby to cause the release of the carriage and the coöperation of the stop part of said stop member with a predetermined column stop.

12. In a typewriting machine and in a tabulating mechanism, the combination of a carriage; carriage feeding mechanism; a plurality of column stops; a column selecting member; key controlled column selecting devices adapted to move said column selecting member different extents; means for maintaining said member in the positions to which it is moved by said column selecting devices; a stop member comprising a stopping part and an actuating arm, said arm being adapted to operate said column selecting member after it has been set and thereby to cause the release of the carriage and the coöperation of the stopping part of said stop member with a predetermined column stop; and means for causing the arrest of said stop member after it has been moved to position to coöperate with said predetermined column stop.

13. In a typewriting machine and in a tabulating mechanism, the combination of a carriage; carriage feeding mechanism; a plurality of column stops; a column selecting member; key controlled column selecting devices adapted to move said column selecting member different extents; means for maintaining said member in the positions to which it is moved by said column selecting devices; a member adapted to release the carriage from its feeding mechanism; and a movable stop member comprising a stopping part and an actuating arm, said arm being adapted to operate said column selecting member after it has been set and thereby to cause said column selecting member to coöperate with said carriage releasing member to effect the release of the carriage and the coöperation between the stopping part of said stop member with a predetermined column stop.

14. In a typewriting machine and in a tabulating mechanism, the combination of a carriage; carriage feeding mechanism; a plurality of column stops; a column selecting member; key controlled column selecting devices adapted to move said column selecting member different extents; means for maintaining said member in the positions to which it is moved by said column selecting devices; a member adapted to release the carriage from its feeding mechanism; a stop member comprising a stopping part and an actuating arm, said arm being adapted to operate said column selecting member after it has been set and thereby to cause said column selecting member to coöperate with said carriage releasing member to effect the release of the carriage and the coöperation between the stopping part of said stop member and a predetermined column stop, said carriage releasing member being adapted to serve as a relatively fixed abutment to arrest the actuating arm of said stop member after the latter has been moved to such a position that its stopping part will coöperate with said predetermined column stop.

15. In a typewriting machine and in a tabulating mechanism, the combination of a carriage; carriage feeding mechanism; means for releasing said carriage from said feeding mechanism; a plurality of column stops; a column selecting member adapted to be moved variable extents in two directions at angles to each other; and a stop adapted to be moved variable extents to coöperate with a predetermined column stop, the extent of effective movement of the variably movable stop being regulated by said column selecting member.

16. In a typewriting machine and in a tabulating mechanism, the combination of a carriage; carriage feeding mechanism; means for releasing said carriage from said feeding mechanism; a plurality of column stops; a column selecting member; means for moving said member variable extents in one direction; means for moving said member variable extents in another direction; and a stop movable variable extents to positions for coöperation with a predetermined column stop, the extent of effective movement of the variably movable stop being regulated by said column selecting member.

17. In a typewriting machine and in a tabulating mechanism, the combination of a carriage; carriage feeding mechanism; means for releasing said carriage from said feeding mechanism; a plurality of column stops; a column selecting member; means for moving said member variable extents in one direction; means for moving said member in another direction variable distances, the extent of which depends on the extent of movement of said member by said first recited moving means; and a stop movable variable extents to position for coöperation with a predetermined column stop, the extent of effective movement of the variably movable stop being regulated by said column selecting member.

18. In a typewriting machine and in a tabulating mechanism, the combination of a carriage; carriage feeding mechanism; means for releasing said carriage from said feeding mechanism; a plurality of column stops; a column selecting member; a plurality of key controlled devices each adapted to move said column selecting member in one direction to an extent different from that to which said member is moved by the other key controlled devices; means for moving said member variable extents in another direction; and a stop movable variable extents to a position for coöperation with a predetermined column stop, the extent of effective movement of the variably movable stop being regulated by said column selecting member.

19. In a typewriting machine and in a tabulating mechanism, the combination of a carriage; carriage feeding mechanism; means for releasing said carriage from said feeding mechanism; a plurality of column stops; a column selecting member; a plurality of column selecting keys; mechanism controlled by said keys for moving said column selecting member in one direction to an extent different from that to which said member is movable by the others of said keys; other key controlled mechanism for moving said column selecting member variable extents in another direction; and a stop movable variable extents to a position for coöperation with a predetermined column stop, the extent of effective movement of the variably movable stop being regulated by said column selecting member.

20. In a typewriting machine and in a tabulating mechanism, the combination of a carriage; carriage feeding mechanism; means for releasing said carriage from said feeding mechanism; a plurality of column stops; a column selecting member; means for moving said member variable extents in one direction; means for maintaining said member in the position to which it has been so moved; means for moving the said member, after it has been set, variable extents in another direction; and a stop movable variable extents to a position for coöperation with a predetermined column stop, the extent of effective movement of the variably movable stop being regulated by said column selecting member.

21. In a typewriting machine and in a tabulating mechanism, the combination of a carriage; carriage feeding mechanism; means for releasing said carriage from said feeding mechanism; a plurality of column stops; a column selecting member; means for moving said member variable extents in one direction; means for maintaining said member in the position to which it has been so moved; means for moving said member in another direction variable distances, the extent of which depends on the extent of movement of said member by said first recited means; and a stop movable variable extents to position for coöperation with a predetermined column stop, the extent of effective movement of the variably movable stop being regulated by said column selecting member.

22. In a typewriting machine and in a tabulating mechanism, the combination of a carriage; carriage feeding mechanism; means for releasing said carriage from said feeding mechanism; a plurality of column stops; a column selecting member; a plurality of key controlled devices, each adapted to move said member in one direction to an extent different from that to which said member is movable by the others of said key controlled devices; means for maintaining said column selecting member to the position to which it has been so moved; means for thereafter moving said member variable extents in another direction; and a stop movable variable extents to position for coöperation with a predetermined column stop, the extent of effective movement of the variably movable stop being regulated by said column selecting member.

23. In a typewriting machine and in a tabulating mechanism, the combination of a carriage; carriage feeding mechanism; means for releasing said carriage from said feeding mechanism; a plurality of column stops; a column selecting member; a plurality of column selecting keys; mechanism controlled by said keys for moving said column selecting member in one direction to an extent different from that to which said member is movable by the others of said keys; means for maintaining said column selecting member in the position to which it has been so moved; other key controlled means for moving said column selecting member, after it has been so set, variable extents in another direction; and a stop movable variable extents to position for coöperation with a predetermined one of said column stops, the extent of effective movement of the variably movable stop being regulated by said column selecting member.

24. In a typewriting machine and in a tabulating mechanism, the combination of a carriage; carriage feeding mechanism; a plurality of column stops; a column selecting member; means for moving said member variable extents in one direction; means for moving said member variable extents in another direction; a stop movable variable extents to position for coöperation with a predetermined one of said column stops; and means for releasing the carriage from its feeding mechanism, said means being actuated by said column selecting member after the stop has been moved to a position where it will coöperate with said predetermined column stops.

25. In a typewriting machine and in a tabulating mechanism, the combination of a carriage; carriage feeding mechanism; a plurality of column stops; a column selecting member; means for moving said member variable extents in one direction; means for moving said member in another direction variable distances, the extent of which depends upon the extent of movement of said member by said first recited means; a coöperating stop movable variable extents to position for coöperation with a predetermined one of said column stops; and means for releasing the carriage from its feeding mechanism, said means being actuated by said column selecting member after said coöperating stop has been moved to a position where it will co-act with said predetermined column stop.

26. In a typewriting machine and in a tabulating mechanism, the combination of a carriage; carriage feeding mechanism; a plurality of column stops; a column selecting member; a plurality of key controlled devices each adapted to move said column selecting member in one direction to an extent different from that to which said member is movable by the others of said devices; means for moving said member variable extents in another direction; a coöperating stop movable variable extents to position for coöperation with a selected one of said column stops; and means for releasing the carriage from its feeding mechanism, said means being actuated by said column selecting member after said coöperating stop has been moved to a position where it will coöperate with a predetermined column stop.

27. In a typewriting machine and in a tabulating mechanism, the combination of a carriage; carriage feeding mechanism; a plurality of column stops; a plurality of column selecting keys; mechanism; a plurality of column selecting keys; mechanism controlled by each of said keys for moving said column selecting device in one direction to an extent different from that to which it is moved by the others of said keys; other key controlled mechanism for moving said column selecting member variable extents in another direction; a coöperating stop movable variable extents to position for coöperation with a predetermined one of said column stops; and means for releasing the carriage from its feeding mechanism, said means being operative by said column selecting member, after said coöperating stop has been moved to a position where it will coöperate with said predetermined column stop.

28. In a typewriting machine and in a tabulating mechanism, the combination of a carriage; carriage feeding mechanism; a plurality of column stops; a column selecting member; a plurality of column selecting keys; mechanism controlled by each of said keys for moving said column selecting member in one direction to an extent different from that to which said member is movable by the others of said keys; means for maintaining said column selecting member in position to which it has been so positioned; other key controlled mechanism for moving said column selecting member, after it has been so set, variable extents in another direction; a coöperative stop movable variable extents to position for coöperation with a predetermined one of said column stops; and means for releasing the carriage from its feeding mechanism, said means being operative by said column selecting member after said coöperative stop has been moved to a position where it will coöperate with said predetermined column stop.

29. In a typewriting machine and in a tabulating mechanism, the combination of a carriage; carriage feeding mechanism; means for releasing said carriage from said feeding mechanism; a member comprising a plurality of column stops; a coöperative stop member, one of said stop members being movable relatively to the other to position said members so that said coöperative stop may coöperate with a predetermined column stop; and a column selecting element movable by the movable one of said first recited members and serving to regulate the extent of effective movement of said movable member.

30. In a typewriting machine and in a tabulating mechanism, the combination of a carriage; carriage feeding mechanism; means for releasing said carriage from said feeding mechanism; a member comprising a plurality of column stops having contact surfaces in different paths of movement; a coöperative stop member, one of said members being movable different extents relatively to the other to position said member so that said coöperative stop, skipping any intervening column stops, may coöperate with a predetermined column stop; and a column selecting element movable by the movable one of said members and serving to regulate the extent of effective movement of said movable member.

31. In a typewriting machine and in a tabulating mechanism, the combination of a carriage; carriage feeding mechanism; means for releasing said carriage from said feeding mechanism; a member comprising a plurality of column stops having contact surfaces in different paths of movement; a coöperative stop member, one of said members being movable different extents relatively to the other to position said member so that said coöperative stop, skipping any intervening column stops, may coöperate with a predetermined column stop; and a column selecting element movable by said movable members, said column selecting element having a plurality of contact portions, each adapted to coöperate with the carriage releasing means at a different point in the path of movement of said element and serving to regulate the extent of effective movement of said movable member.

32. In a typewriting machine and in a tabulating mechanism, the combination of a carriage; carriage feeding mechanism; means for releasing said carriage from said feeding mechanism; a member comprising a plurality of column stops having contact surfaces in different paths of movement; a coöperative stop member, one of said members being movable different extents relatively to the other to position said member so that said coöperative stop, skipping any intervening column stops, may coöperate with a predetermined column stop; a column selecting element movable by said movable member, said column selecting element having a plurality of contact portions, each adapted to coöperate with the carriage releasing means at a different point in the path of movement of said element; and means to render said carriage releasing member a relatively fixed abutment which coöperates with the contact portions of said column selecting element to limit the movement of said movable member.

33. In a typewriting machine and in a tabulating mechanism, the combination of a carriage; carriage feeding mechanism; a member adapted to release said carriage from its feeding mechanism; a plurality of column stops; a coöperative stop member; a column selecting element or member comprising a plurality of contact portions; means for positioning said element so that when subsequently operated a predetermined one of said contact portions will be caused to coöperate with said carriage releasing member, said carriage releasing member being adapted to limit the movement of said column selecting element when the latter is subsequently operated.

34. In a typewriting machine and in a tabulating mechanism, the combination of a carriage; carriage feeding mechanism; a member adapted to release said carriage from its feeding mechanism; a plurality of column stops; a coöperative stop member; a column selecting element or member operative by said coöperative stop member and comprising a plurality of contact portions; means for initially moving said element to position to cause a predetermined one of said contact portions to coöperate with said carriage releasing member, said carriage releasing member being adapted to limit the movement of said column selecting element when the latter is subsequently operated by said coöperative stop member.

35. In a typewriting machine and in a tabulating mechanism, the combination of a carriage; carriage feeding mechanism; carriage releasing mechanism; a plurality of column stops; a coöperative stop; column selecting means; a plurality of keys for operating said means; means for locking said keys, when actuated, in operative position and for unlocking the locked key when any other of said keys is operated.

36. In a typewriting machine and in a tabulating mechanism, the combination of a carriage; carriage feeding mechanism; means for releasing said carriage from said feeding mechanism; a plurality of column stops; a coöperative stop; column selecting means adapted to cause a coöperation between said coöperative stop and a predetermined column stop when the carriage is released; a plurality of column keys for operating said means; and means for locking said column keys in operative position and for unlocking the locked column key when another one of said column keys is operated.

37. In a typewriting machine and in a tabulating mechanism, the combination of a carriage; carriage feeding mechanism; means for releasing said carriage from said feeding mechanism; a plurality of column stops; a coöperative stop; column selecting means adapted to be set or locked to cause a coöperation between said coöperative stop and a predetermined column stop when the carriage is released, said means being adapted to remain set until it is operated to bring about a coöperative relation between said coöperative stop and another one of said column stops.

38. In a typewriting machine and in a tabulating mechanism, the combination of a carriage; carriage feeding mechanism; means for releasing said carriage from said feeding mechanism; a plurality of column stops; a coöperative stop; column selecting means adapted to be set or locked to cause a coöperation between said coöperative stop and a predetermined column stop when the carriage is released; a plurality of column keys for operating said column selecting means, said column selecting means being adapted to be set for one column when one of said column keys is operated and to remain so set until another column key is operated.

39. In a typewriting machine and in a tabulating mechanism, the combination of a carriage; carriage feeding mechanism; means for releasing said carriage from said feeding mechanism; a plurality of column stops; a coöperative stop; a column selecting member; a plurality of key controlled devices for variably operating said member; and means for locking said member in operative position when moved thereto by one of said devices, said locking means being adapted to unlock said member when another of said devices is operated.

40. In a typewriting machine and in a tabulating mechanism, the combination of a carriage; carriage feeding mechanism; means for releasing said carriage from said feeding mechanism; a plurality of column stops; a coöperative stop; a column selecting member; a plurality of key controlled devices for variably operating said member; and means for locking said devices one at a time in operative position and thereby setting said column selecting member, the locked device being unlocked when another of said devices is operated.

41. In a typewriting machine and in a tabulating mechanism, the combination of a carriage; carriage feeding mechanism; a plurality of column stops; a set of coöperative denomination stop members; and a column selecting member adapted to be actuated by said denomination stop members to effect the release of the carriage and to cause the actuated denomination stop member to coöperate with a predetermined column stop to arrest the carriage at a predetermined denominational position in a predetermined columnar field.

42. In a typewriting machine and in a tabulating mechanism, the combination of a carriage; carriage feeding mechanism; a plurality of column stops; a column selecting member; key operated mechanism for variably setting said column selecting member; and a set of denomination stop members, said column selecting member being adapted, after it has been set, to be actuated by said denomination stop members to cause the release of the carriage and the coöperation thereafter of the actuated denomination stop member with a predetermined column stop in order to arrest the carriage in desired denominational position.

43. In a typewriting machine and in a tabulating mechanism, the combination of a carriage; carriage feeding mechanism; a plurality of column stops; a column selecting member; key controlled column selecting devices adapted to set said column selecting member for different columns; a set of denomination stop members, each adapted to actuate said column selecting member to cause the release of the carriage and the coöperation thereafter of the actuated denomination stop member with a predetermined column stop.

44. In a typewriting machine and in a tabulating mechanism, the combination of a carriage; carriage feeding mechanism; a plurality of column stops; a column selecting member; key controlled column selecting devices adapted to move said column selecting member different extents; means for maintaining said member in position when so moved; and a set of denomination stop members adapted to actuate said column selecting member, after said member has been so set, to effect the release of the carriage and the coöperation of the actuated denomination stop member with a predetermined column stop.

45. In a typewriting machine and in a tabulating mechanism, the combination of a carriage; carriage feeding mechanism; a plurality of column stops; a column selecting member; key controlled column selecting devices adapted to move said member different extents; means for maintaining said member in position when so moved; a set of denomination stop members adapted to actuate said column selecting member after it has been set, in order to effect the coöperation of the actuated column stop with a predetermined column stop; and means for causing the arrest of said denomination stop member after it has been moved to coöperative position.

46. In a typewriting machine and in a tabulating mechanism, the combination of a carriage; carriage feeding mechanism; a plurality of column stops; a set of coöperating denomination stop members, each comprising a stop part and an actuating arm; and a column selecting member adapted to be operated by the actuating arms of said denomination stop members to effect the release of the carriage and to cause the stop part of the actuated denominational stop member to coöperate with a predetermined column stop to arrest the carriage at a predetermined denominational position in a predetermined column.

47. In a typewriting machine and in a tabulating mechanism, the combination of a carriage; carriage feeding mechanism; a plurality of column stops; a column selecting member; key operated means for variably setting said column selecting member; and a set of denomination stop members each comprising a stop part and an actuating arm, said column selecting member being adapted, after it has been set, to be operated by the actuating arms of said denomination stop members to cause the release of the carriage and the coöperation thereafter of the stop part of the actuated denomination stop member with a predetermined column stop in order to arrest the carriage at a predetermined denominational position in a predetermined column.

48. In a typewriting machine and in a tabulating mechanism, the combination of a carriage; carriage feeding mechanism; a plurality of column stops; a column selecting member; key controlled column selecting devices adapted to move said column selecting member different extents; means for maintaining said member in the positions to which it is so moved; and a set of denomination stop members, each comprising a stop part and an actuating arm, the arms of said denomination stop members being adapted to operate said column selecting member, after it has been set, and thereby to cause the release of the carriage and the coöperation of the stop part of the actuated denomination stop member with a predetermined column stop, whereby the carriage is arrested at a predetermined denominational position in a predetermined column.

49. In a typewriting machine and in a tabulating mechanism, the combination of a carriage; carriage feeding mechanism; a plurality of column stops; a column selecting member; key controlled column selecting devices adapted to move said member different extents; means for maintaining or setting said member in the positions to which it is so moved; a set of denomination stop members, each comprising a stop part and an actuating arm, said arms being adapted to operate said column selecting member after it has been set, and thereby to cause the release of the carriage and the coöperation of the stop part of the actuated denomination stop member with a predetermined column stop; and means for causing the arrest of the actuated denomination stop member after it has been moved to position to coöperate with said predetermined column stop.

50. In a typewriting machine and in a tabulating mechanism, the combination of a carriage; carriage feeding mechanism; a plurality of column stops; a column selecting member; key controlled column selecting devices adapted to move said member different extents; means for maintaining said member in the positions to which it is so moved; a member adapted to release the carriage from its feeding mechanism; and a set of denomination stop members, each comprising a stop part and an actuating arm, said arms being adapted to operate said column selecting member after it has been set, and thereby to cause said member to coöperate with said carriage releasing member to effect the release of the carriage and the coöperation between the stop part of the actuated denomination stop member with a predetermined column stop.

51. In a typewriting machine and in a tabulating mechanism, the combination of a carriage; carriage feeding mechanism; a plurality of column stops; a column selecting member; key controlled column selecting devices adapted to move said member different extents; means for maintaining or setting said member in the positions to which it is so moved; a member adapted to release the carriage from its feeding mechanism; a set of denomination stop members, each comprising a stop part and an actuating arm, said arms being adapted to operate said column selecting member after it has been set and thereby to cause said member to coöperate with said carriage releasing member to effect the release of the carriage and the coöperation between the stop part of the actuated denomination stop member and a predetermined column stop, said carriage releasing member being adapted to serve as a relatively fixed abutment to arrest the actuated arm of said actuated denomination stop member after the latter has been moved to such a position that its stop part will coöperate with said predetermined column stop.

52. In a typewriting machine and in a tabulating mechanism, the combination of a carriage; carriage feeding mechanism; means for releasing said carriage from said feeding mechanism; a plurality of column stops; a column selecting member adapted to be moved variable extents in two directions at angles to each other; and a set of denomination stops adapted to be moved variable extents to coöperate with predetermined column stops, the extent of effective movement of said denomination stops being regulated by said column selecting member.

53. In a typewriting machine and in a tabulating mechanism, the combination of a carriage; carriage feeding mechanism; means for releasing said carriage from said feeding mechanism; a plurality of column stops; a column selecting member; means for moving said member variable extents in one direction; means for moving said member variable extents in another direction; and a set of denomination stops movable variable extents to positions for coöperation with predetermined column stops, the extent of effective movement of said denomination stops being regulated by said column selecting member.

54. In a typewriting machine and in a tabulating mechanism, the combination of a carriage; carriage feeding mechanism; means for releasing said carriage from said feeding mechanism; a plurality of column stops; a column selecting member; means for moving said member variable extents in one direction; means for moving said member in another direction variable distances, the effective extents of which depend on the extent of movement of said member by said first recited moving means; and a set of denomination stops movable variable extents for coöperation with predetermined column stops, the extent of movement of said denomination stops being regulated by said column selecting member.

55. In a typewriting machine and in a tabulating mechanism, the combination of a carriage; carriage feeding mechanism; means for releasing said carriage from said mechanism; a plurality of column stops; a column selecting member; a plurality of key controlled devices adapted to move said member in one direction different extents; means for moving said member variable extents in another direction; and a set of denomination stops movable variable extents to positions for coöperation with predetermined column stops, the extent of movement of said denomination stops being regulated by said column selecting member.

56. In a typewriting machine and in a tabulating mechanism, the combination of a carriage; carriage feeding mechanism; means for releasing said carriage from said mechanism; a plurality of column stops; a column selecting member; a plurality of key controlled devices adapted to move said member in one direction different extents; other key controlled mechanism for moving said member variable extents in another direction; and a set of denomination stops movable variable extents to positions for coöperating with predetermined column stops, the extent of movement of said denomination stops being regulated by said column selecting member.

57. In a typewriting machine and in a tabulating mechanism, the combination of a carriage; carriage feeding mechanism; means for releasing said carriage from said feeding mechanism; a plurality of column stops; a column selecting member; means for moving said member variable extents in one direction; means for maintaining said member in the position to which it has been so moved; means for moving said member, after it has been set, variable extents in another direction; and a set of denomination stops movable variable extents to positions for coöperation with predetermined column stops, the extent of movement of said denomination stops being regulated by said column selecting member.

58. In a typewriting machine and in a tabulating mechanism, the combination of a carriage; carriage feeding mechanism; a plurality of column stops; a column selecting member; a plurality of column selecting keys; mechanism controlled by said keys for moving said member different extents in one direction; means for maintaining said column selecting member in the position to which it has been so moved; other key controlled means for moving said column selecting member, after it has been so set, variable extents in another direction; and a set of denomination stops movable variable extents to positions for coöperation with predetermined column stops, the extent of movement of said denomination stops being regulated by said column selecting member.

59. In a typewriting machine and in a tabulating mechanism, the combination of a carriage; carriage feeding mechanism; a plurality of column stops; a column selecting member; means for moving said member variable extents in one direction; means for moving said member variable extents in another direction; a set of denomination stops movable variable extents to positions for coöperation with predetermined column stops; and means for releasing the carriage from its feeding mechanism, said means being operative by said column selecting member, after the actuated denomination stop has been moved to a position to coöperate with a predetermined column stop.

60. In a typewriting machine and in a tabulating mechanism, the combination of a carriage; carriage feeding mechanism; a plurality of column stops; a column selecting member; a plurality of column selecting keys; mechanism controlled by said keys for moving said member different extents in one direction; means for maintaining said column selecting member in positions to which it may be so moved; other key controlled mechanism for moving said column selecting member, after it has been set, variable extents in another direction; a set of denomination stops movable variable extents for coöperation with predetermined column stops; and means for releasing the carriage from its feeding mechanism, said means being operative by said column selecting member after the actuated denomination stop has been moved to a position where it will coöperate with a predetermined column stop.

61. In a typewriting machine and in a tabulating mechanism, the combination of a carriage; carriage feeding mechanism; a member adapted to release said carriage from its feeding mechanism; a plurality of column stops; a set of coöperative denomination stops; a column selecting element or member comprising a plurality of contact portions; and means for moving said member to position to cause a predetermined one of said contact portions to coöperate with said carriage releasing member, said carriage releasing member being adapted to limit the movement of said column selecting element when the latter is subsequently operated, whereby a selected denomination stop is caused to coöperate with a predetermined column stop.

62. In a typewriting machine and in a tabulating mechanism, the combination of a carriage; carriage feeding mechanism; a member adapted to release said carriage from its feeding mechanism; a plurality of column stops; a set of coöperative denomination stop members; a column selecting element or member operative by said denomination stop members and comprising a plurality of contact portions; and means for initially moving said element to position to cause a predetermined one of said contact portions to coöperate with said carriage releasing member, said carriage releasing member being adapted to limit the movement of said column selecting element when the latter is subsequently operated by a selected one of said denomination stop members.

63. In a typewriting machine and in a tabulating mechanism, the combination of a carriage; carriage feeding mechanism; carriage releasing mechanism; a plurality of column stops; a set of coöperative denomination stops; column selecting means; a plurality of keys for operating said means; and means for locking said keys, when actuated, in operative position and for unlocking the locked key when any other of said keys is operated, the locked key being adapted to remain locked in operated position during the operations of said denomination stops.

64. In a typewriting machine and in a tabulating mechanism, the combination of a carriage; carriage feeding mechanism; means for releasing said carriage from said feeding mechanism; a plurality of column stops; a set of coöperative denomination stops; column selecting means adapted to cause a coöperation between said denomination stops and predetermined column stops when the carriage is released; a plurality of column keys for operating said selecting means; and means for locking said column keys in operative position and for unlocking a locked column key when any one of said column keys is operated, said locked key remaining locked during the operation of said denomination stops.

65. In a typewriting machine and in a tabulating mechanism, the combination of a carriage; carriage feeding mechanism; means for releasing said carriage from said feeding mechanism; a plurality of column stops; a set of coöperative denomination stops; and column selecting means adapted to be set or locked to cause a coöperation between a selected denomination stop and a predetermined column stop when the carriage is released, said selecting means being adapted to remain set until it is operated to bring about a coöperative relation between any one of said column stops and the denomination stops.

66. In a typewriting machine and in a tabulating mechanism, the combination of a carriage; carriage feeding mechanism; means for releasing said carriage from said feeding mechanism; a plurality of column stops; a set of denomination stops; column selecting means adapted to be set or locked to cause a coöperation between the selected denomination stops and a predetermined column stop when the carriage is released; and a plurality of column keys for operating said selecting means, said selecting means being adapted to be set for one column when one of said column keys is operated and to remain so set until another column key is operated and during the operations of selected denomination stops.

67. In a typewriting machine and in a tabulating mechanism, the combination of a carriage; carriage feeding mechanism; means for releasing said carriage from said feeding mechanism; a plurality of column stops; a set of coöperative denomination stops; a column selecting member; a plurality of key controlled devices for variably operating said member; and means for locking said member in operated position when moved thereto by one of said devices, said means being adapted to unlock said member when another of said devices is operated, said member being adapted to remain locked during the operations of selected denomination stops.

68. In a typewriting machine and in a tabulating mechanism, the combination of a carriage; carriage feeding mechanism; means for releasing said carriage from said feeding mechanism; a plurality of column stops; a set of coöperative denomination stops; a column selecting member; a plurality of key controlled devices for variably operating said member; and means for locking said devices one at a time in operated position and thereby setting said column selecting member to effect a coöperation between a predetermined column stop and selected denomination stops, the locking device being unlocked when any of said devices other than the locked device is operated.

69. In a typewriting machine and in a tabulating mechanism, the combination of a carriage; a stop bar; a plurality of adjustable column stops on said bar, the contact surfaces of said stops being out of line with each other; a set of key operated denomination levers; denomination stops associated therewith; and a column selecting slide, said slide being adapted to be given a movement of translation by the column keys and a rotary movement by the denomination keys.

70. In a typewriting machine and in a tabulating mechanism, the combination of a carriage; a stop bar; a plurality of adjustable column stops on said bar, the contact surfaces of said stops being out of line with each other; a set of key operated denomination levers; denomination stops associated therewith; a column selecting slide; and a set of key operated column selecting levers, said slide being operative first by one of said column selecting levers and thereafter by one of said denomination levers.

71. In a typewriting machine and in a tabulating mechanism, the combination of a carriage; a stop bar; a plurality of adjustable column stops on said bar, the contact surfaces of said stops being out of line with each other; a set of key operated denomination levers; denomination stops associated therewith; a column selecting slide normally maintained against said levers and adapted to slide thereover, said slide being provided with a plurality of contact edges; and a set of key operated column selecting levers adapted to coöperate with said contact edges of said slide to move the latter different extents, said slide being adapted to be given a rotary movement thereafter by said denomination stop members.

72. In a typewriting machine and in a tabulating mechanism, the combination of a carriage; a stop bar; a plurality of adjustable column stops on said bar, the contact surfaces of said stops being out of line with each other;

a set of key operated denomination levers; denomination stops associated therewith; a column selecting slide normally maintained against said levers and adapted to slide thereover, said slide being provided with a stepped contact portion; carriage releasing devices comprising a pivoted release plate or elbow lever; and key controlled column selecting levers adapted to move said slide different extents, said slide being adapted to be moved thereafter by said denomination stop levers to operate with said carriage releasing plate.

73. In a typewriting machine and in a tabulating mechanism, the combination of a carriage; a stop bar; a plurality of adjustable column stops on said bar, the contact surfaces of said stops being out of line with each other; a set of key operated denomination levers; denomination stops associated therewith; a column selecting slide normally maintained against said levers and adapted to slide thereover, said slide being provided with a stepped contact portion; carriage releasing devices comprising a pivoted release plate or elbow lever; key controlled column selecting levers adapted to move said slide different extents, said slide being adapted to be moved thereafter by said denomination stop levers to coöperate with said carriage releasing plate; and a pivoted spring pressed locking plate adapted to lie under the actuated column selecting lever and maintain said lever in operative position.

74. In a typewriting machine and in a tabulating mechanism, the combination of a carriage; a stop bar; a plurality of adjustable column stops on said bar, the contact surfaces of said stops being out of line with each other; a set of key operated denomination levers; denomination stops associated therewith; a column selecting slide normally maintained against said levers and adapted to slide thereover, said slide being provided with a stepped contact portion; carriage releasing devices comprising a pivoted release plate or elbow lever; key controlled column selecting levers adapted to move said slide different extents, said slide being adapted to be moved thereafter by said denomination stop levers to coöperate with said carriage releasing plate; and a pivoted spring pressed locking plate adapted to lie under the actuated column selecting lever and maintain said lever in operative position, each of said column selecting levers being provided with a cam edge which is operative on said locking plate to move the latter and release a hitherto operated column selecting lever.

75. In a typewriting machine and in a tabulating mechanism, the combination of a carriage; a stop bar; a plurality of adjustable column stops on said bar, the contact surfaces of said stops being out of line with each other; a set of key operated bell crank denomination levers having denomination stops at their ends, which stops are adapted to be moved variable extents transversely of the path of movement of said column stops; a slide provided with column selecting stops, said slide being arranged against said denomination levers and being movable thereover; key operated column selecting levers operative to move said slide different extents; a locking plate operative to maintain one of said column selecting levers operative until another of said levers is actuated; and carriage releasing devices comprising a pivoted releasing plate or lever, said slide being adapted, after it has been set by one of said column selecting members, to be moved by any one of said denomination levers to cause a predetermined column selecting stop to coöperate with said releasing plate to release said carriage.

76. In a typewriting machine, the combination of a carriage; carriage feeding mechanism; means for releasing said carriage from said feeding mechanism; and a device for regulating the speed of said carriage when released, said device being operative by said releasing means and comprising a screw and a coöperative member adapted to rotate said screw.

77. In a typewriting machine, the combination of a carriage; carriage feeding mechanism; means for releasing said carriage from said feeding mechanism; a device for regulating the speed of said carriage when released, said device being operative by said releasing means and comprising a screw and a coöperative member adapted to rotate said screw; and means for regulating the power required to turn said screw.

78. In a typewriting machine, the combination of a carriage; carriage feeding mechanism; means for releasing said carriage from said feeding mechanism; and a device for regulating the speed of said carriage when released, said device being operative by said releasing means and comprising a screw and a coöperative member adapted to rotate said screw; and a friction spring operative on said screw.

79. In a typewriting machine, the combination of a carriage; carriage feeding mechanism; means for releasing the carriage from said feeding mechanism; and a speed regulating device operative by said releasing means, said device comprising a screw rod rotatably mounted on said carriage and a coöperating finger on the machine frame.

80. In a typewriting machine, the combination of a carriage; carriage feeding mechanism; means comprising a releasing lever for releasing the carriage from said feeding mechanism; a screw rod rotatably mounted on said carriage; and a finger pivoted on the machine frame and adapted to coöperate with said screw rod to regulate the speed of said carriage, said finger being normally rendered inoperative by said releasing lever.

81. In a typewriting machine, the combination of a carriage; carriage feeding mechanism; means comprising a releasing lever for releasing the carriage from said feeding mechanism; a screw rod rotatably mounted on said carriage; and a finger pivoted on the machine frame and adapted to coöperate with said screw rod to regulate the speed of said carriage, said finger being normally rendered inoperative by said releasing lever; and means for regulating the power necessary to rotate said rod.

82. In a typewriting machine, the combination of a carriage; carriage feeding mechanism; means comprising a releasing lever for releasing the carriage from said feeding mechanism; a screw rod rotatably mounted on said carriage; a finger pivoted on the machine frame and adapted to coöperate with said screw rod to regulate the speed of said carriage, said finger being normally rendered inoperative by said releasing lever; and an adjustable friction spring operated on said screw rod.

83. In a typewriting machine and in tabulating mechanism, the combination of a releasable carriage, a plurality of column stops, a set of movable denominational stop members, and means for variably arresting any actuated denominational stop member in position for coöperation with any selected one of said column stops, said means comprising a selecting member adjustable to different positions for selecting different column stops.

84. In a typewriting machine and in a tabulating mechanism, the combination of a releasable carriage; a plurality of column stops; a set of movable denominational stop members; and means operative to arrest the actuated stop member in position where it will coöperate with a predetermined column stop, said means including a column selecting member movable by each of said denominational stop members.

85. In a typewriting machine and in a tabulating mechanism, the combination of a releasable carriage; a plurality of column stops; a set of movable denominational stop members; means for arresting the actuated stop member in position where it will coöperate with a predetermined column stop, said means including a column selecting member movable by any actuated denomination stop member; and hand-operated mechanism for variably setting said selecting member.

Signed at the borough of Manhattan, city of New York, in the county of New York, and State of New York, this 11th day of January, A. D. 1906.

ARTHUR W. SMITH.

Witnesses:
E. M. WELLS,
M. F. HANNWEBER.